United States Patent
Pfoh et al.

(10) Patent No.: US 10,621,338 B1
(45) Date of Patent: Apr. 14, 2020

(54) METHOD TO DETECT FORGERY AND EXPLOITS USING LAST BRANCH RECORDING REGISTERS

(71) Applicant: FireEye, Inc., Milpitas, CA (US)

(72) Inventors: Jonas Pfoh, Dresden (DE); Phung-Te Ha, Dublin, CA (US)

(73) Assignee: FireEye, Inc., Milpitas, CA (US)

( * ) Notice: Subject to any disclaimer, the term of this patent is extended or adjusted under 35 U.S.C. 154(b) by 553 days.

(21) Appl. No.: 15/197,656

(22) Filed: Jun. 29, 2016

Related U.S. Application Data

(60) Provisional application No. 62/273,392, filed on Dec. 30, 2015.

(51) Int. Cl.

| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/54* | (2013.01) |
| *G06F 21/55* | (2013.01) |
| *G06F 9/455* | (2018.01) |

(52) U.S. Cl.
CPC .......... *G06F 21/54* (2013.01); *G06F 9/45558* (2013.01); *G06F 21/554* (2013.01); *G06F 2009/45587* (2013.01); *G06F 2221/033* (2013.01)

(58) Field of Classification Search
USPC .......................................................... 726/23
See application file for complete search history.

(56) References Cited

U.S. PATENT DOCUMENTS

| | | |
|---|---|---|
| 5,490,249 A | 2/1996 | Miller |
| 5,983,348 A | 11/1999 | Ji |
| 7,072,876 B1 | 7/2006 | Michael |
| 7,346,486 B2 | 3/2008 | Ivancic et al. |
| 7,478,428 B1 | 1/2009 | Thomlinson |
| 7,584,455 B2 | 9/2009 | Ball |
| 8,225,288 B2 | 7/2012 | Miller et al. |

(Continued)

OTHER PUBLICATIONS

Pappas et al. "Transparent ROP Exploit Mitigation using Indirect Branch Tracing" Aug. 2013.

(Continued)

*Primary Examiner* — Jeffrey C Pwu
*Assistant Examiner* — Samuel Ambaye
(74) *Attorney, Agent, or Firm* — Rutan & Tucker, LLP

(57) ABSTRACT

A method for detecting a ROP attack comprising processing of an object within a virtual machine managed by a virtual machine monitor (VMM), intercepting an attempted execution by the object of an instruction, the instruction stored on a page in memory that is accessed by the virtual machine, responsive to determining the page includes instructions corresponding to one of a predefined set of function calls, (i) inserting a first transition event into the memory at a starting address location of a function call, and (ii) setting a permission of the page to be execute only, and responsive to triggering the first transition event, halting, by the VMM, the processing of the object and analyzing, by logic within the VMM, content of last branch records associated with the virtual machine to determine whether the processing of the object displays characteristics of a ROP attack is shown.

26 Claims, 6 Drawing Sheets

(56) References Cited

U.S. PATENT DOCUMENTS

| | | |
|---|---|---|
| 8,286,251 B2 | 10/2012 | Eker et al. |
| 8,321,936 B1 | 11/2012 | Green et al. |
| 8,365,286 B2 | 1/2013 | Poston |
| 8,510,827 B1 | 8/2013 | Leake et al. |
| 8,510,842 B2 | 8/2013 | Amit et al. |
| 8,682,054 B2 | 3/2014 | Xue et al. |
| 8,726,392 B1 | 5/2014 | McCorkendale et al. |
| 8,793,787 B2 | 7/2014 | Ismael et al. |
| 9,009,822 B1 | 4/2015 | Ismael et al. |
| 9,009,823 B1 | 4/2015 | Ismael et al. |
| 9,159,035 B1 | 10/2015 | Ismael et al. |
| 9,176,843 B1 | 11/2015 | Ismael et al. |
| 9,225,740 B1 | 12/2015 | Ismael et al. |
| 9,367,681 B1 | 6/2016 | Ismael et al. |
| 9,594,905 B1 | 3/2017 | Ismael et al. |
| 9,792,196 B1 | 10/2017 | Ismael et al. |
| 9,824,209 B1 | 11/2017 | Ismael et al. |
| 10,181,029 B1 | 1/2019 | Ismael et al. |
| 10,296,437 B2 | 5/2019 | Ismael et al. |
| 2003/0208744 A1 | 11/2003 | Amir et al. |
| 2005/0091652 A1 | 4/2005 | Ross et al. |
| 2005/0108562 A1 | 5/2005 | Khazan et al. |
| 2005/0187740 A1 | 8/2005 | Marinescu |
| 2006/0248519 A1 | 11/2006 | Jaeger et al. |
| 2007/0157180 A1 | 7/2007 | Tillmann et al. |
| 2007/0168988 A1 | 7/2007 | Eisner et al. |
| 2008/0066179 A1 | 3/2008 | Liu |
| 2008/0320556 A1 | 12/2008 | Lee et al. |
| 2009/0031403 A1 | 1/2009 | Huang |
| 2009/0036111 A1 | 2/2009 | Danford et al. |
| 2009/0044024 A1 | 2/2009 | Oberheide et al. |
| 2009/0113425 A1 | 4/2009 | Ports et al. |
| 2009/0125976 A1 | 5/2009 | Wassermann et al. |
| 2009/0126016 A1 | 5/2009 | Sobko et al. |
| 2009/0187697 A1* | 7/2009 | Serebrin ............... G06F 9/455 711/6 |
| 2009/0265692 A1 | 10/2009 | Godefroid et al. |
| 2010/0180344 A1 | 7/2010 | Malyshev et al. |
| 2010/0192223 A1 | 7/2010 | Ismael et al. |
| 2010/0251000 A1 | 9/2010 | Lyne et al. |
| 2010/0299754 A1 | 11/2010 | Amit et al. |
| 2011/0219449 A1 | 9/2011 | St. Neitzel et al. |
| 2011/0302587 A1 | 12/2011 | Nishikawa et al. |
| 2012/0121154 A1 | 5/2012 | Xue et al. |
| 2012/0198279 A1 | 8/2012 | Schroeder |
| 2013/0086684 A1 | 4/2013 | Mohler |
| 2013/0097706 A1 | 4/2013 | Titonis et al. |
| 2013/0160130 A1 | 6/2013 | Mendelev et al. |
| 2013/0160131 A1 | 6/2013 | Madou et al. |
| 2013/0185798 A1 | 7/2013 | Saunders et al. |
| 2013/0246370 A1 | 9/2013 | Bartram et al. |
| 2014/0123281 A1* | 5/2014 | Fischer ............... G06F 21/566 726/23 |
| 2014/0179360 A1 | 6/2014 | Jackson et al. |
| 2014/0337836 A1 | 11/2014 | Ismael |
| 2015/0096025 A1 | 4/2015 | Ismael |
| 2015/0128266 A1* | 5/2015 | Tosa ................... G06F 21/556 726/23 |

OTHER PUBLICATIONS

"Second Level Address Translation" https://en.wikipedia.org/wiki/Second_Level_Address_Translation, last accessed Dec. 5, 2015.

Gilbert, Peter, et al. "Vision: automated security validation of mobile apps at app markets." Proceedings of the second nternational workshop on Mobile cloud computing and services. ACM, 2011.

High-performance server systems and the next generation of online games, D'Amora, B.; Nanda, A.; Magerlein, K.; Binstock, A.; Yee, B., IBM Systems Journal Year: 2006, vol. 45, Issue: 1 pp. 103-118, DOI: 10.1147/sj.451.0103.

Hu, Cuixiong, and Lulian Neamtiu. "Automating GUI testing for Android applications." Proceedings of the 6th International Workshop on Automation of Software Test. ACM, 2011.

Li et al., A VMM-Based System Call Interposition Framework for Program Monitoring, Dec. 2010, IEEE 16th International Conference on Parallel and Distributed Systems, pp. 706-711.

Towards Understanding Malware Behaviour by the Extraction of API Calls, Alazab, M.; Venkataraman, S.; Watters, P. Cybercrime and Trustworthy Computing Workshop (CTC), 2010 Second Year: 2010 pp. 52-59, DOI: 10.1109/CTC.2010.8.

U.S. Appl. No. 13/775,168, Final Office Action, dated Nov. 14, 2014.

U.S. Appl. No. 13/775,168, Non-Final Office Action, dated Jun. 13, 2014.

U.S. Appl. No. 13/775,168, Non-Final Office Action, dated Mar. 16, 2015.

U.S. Appl. No. 13/775,168, Notice of Allowance, dated Aug. 24, 2015.

U.S. Appl. No. 13/775,169, Non Final Office Action, dated Mar. 12, 2014.

U.S. Appl. No. 13/775,169, filed Feb. 23, 2013 Notice of Allowance dated Jan. 13, 2015.

U.S. Appl. No. 13/775,170, filed Feb. 23, 2013 Non-Final Office Action dated Jan. 23, 2015.

U.S. Appl. No. 13/775,172, filed Feb. 23, 2013 Examiner's Answer dated Oct. 8, 2015.

U.S. Appl. No. 13/775,172, filed Feb. 23, 2013 Final Office Action dated Dec. 9, 2014.

U.S. Appl. No. 13/775,172, filed Feb. 23, 2013 Non-Final Office Action dated Apr. 22, 2014.

U.S. Appl. No. 13/775,172, filed Feb. 23, 2013 Non-Final Office Action dated Apr. 6, 2017.

U.S. Appl. No. 13/775,172, filed Feb. 23, 2013 Notice of Allowance dated Aug. 18, 2017.

U.S. Appl. No. 13/775,172, filed Feb. 23, 2013 Patent Board Decision dated Dec. 1, 2016.

U.S. Appl. No. 13/775,171, filed Feb. 23, 2013 Final Office Action dated Dec. 12, 2014.

U.S. Appl. No. 13/775,171, filed Feb. 23, 2013 Non-Final Office Action dated Aug. 5, 2015.

U.S. Appl. No. 13/775,171, filed Feb. 23, 2013 Non-Final Office Action dated Mar. 27, 2014.

U.S. Appl. No. 13/775,171, filed Feb. 23, 2013 Notice of Allowance dated Feb. 10, 2016.

U.S. Appl. No. 14/495,762, filed Sep. 24, 2014 Non-Final Office Action dated Apr. 6, 2015.

U.S. Appl. No. 14/495,762, filed Sep. 24, 2014 Notice of Allowance dated Oct. 2, 2015.

Use of Role Based Access Control for Security-Purpose Hypervisors, Hirano, M.; Chadwick, D.W.; Yamaguchi, S. Trust, Security and Privacy in Computing and Communications (TrustCom), 2013 12th IEEE International Conference on Year: 2013 pp. 1613-1619, DOI: 10.1109/TrustCom.2013.199.

Wang et al., "A Static Analysis Approach for Automatic Generating Test Cases for Web Applications," Dec. 2008, International Conference on Computer Science and Software Engineering, pp. 751-754.

\* cited by examiner

METHOD TO DETECT FORGERY AND EXPLOITS USING LAST BRANCH RECORDING REGISTERS

CROSS-REFERENCE TO RELATED APPLICATIONS

This application claims the benefit of priority on U.S. Provisional Application No. 62/273,392, filed Dec. 30, 2015, the entire contents of which are incorporated by reference herein.

FIELD

Embodiments of the disclosure relate to the field of cyber security. More specifically, embodiments of the disclosure relate to a system for detecting exploits associated with return-oriented programming (ROP) attacks through the use of Last Branch Recording registers.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by exploits, namely malicious computer code that attempts to take advantage of a vulnerability in computer software by acquiring sensitive information or adversely influencing or attacking normal operations of the network device or the entire enterprise network.

In particular, an exploitation technique known as return-oriented programming (ROP) has become fairly widespread recently. ROP is an exploitation technique that allows a writer of malware to chain together sequences of instructions through "return" instructions thereby accomplishing one or more tasks via the execution of the chain of sequences of instructions. The ROP technique was developed as a way to circumvent exploit prevention techniques, such as data execution prevention (DEP) techniques, which have been recently implemented in many operating systems to thwart unauthorized activities including malicious attacks.

Using the ROP technique, malware writers attempt to gain control of the stack and subsequently execute sequences of instructions appearing in executable code, such as a dynamically-loaded library (DLL). The sequences of instructions are chained together through the use of "return" instructions following the sequence of instructions. For example, the "return" instruction following a first sequence of instructions (sequence_1) will point to a starting address of a second sequence of instructions (sequence_2).

The ROP technique often violates a well-known programming invariant which states that an instruction immediately preceding the location branched to by a "return" instruction must be a "call" instruction. Therefore, a malware detection system may detect the use of the ROP technique by determining whether the execution of an application violates this invariant.

Currently, malware detection systems running within a virtual machine may attempt to detect the use of the ROP technique by analyzing the Last Branch Records (LBRs) of a CPU while an application under analysis is executing. However, the application may thwart or avoid detection by reading a register of the model-specific registers (MSRs) and thereby detecting that the LBR functionality is turned on. The application may then alter its intended malicious operations to avoid detection. In addition, the application may detect the LBR functionality is turned on and subsequently turn off the LBR functionality.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
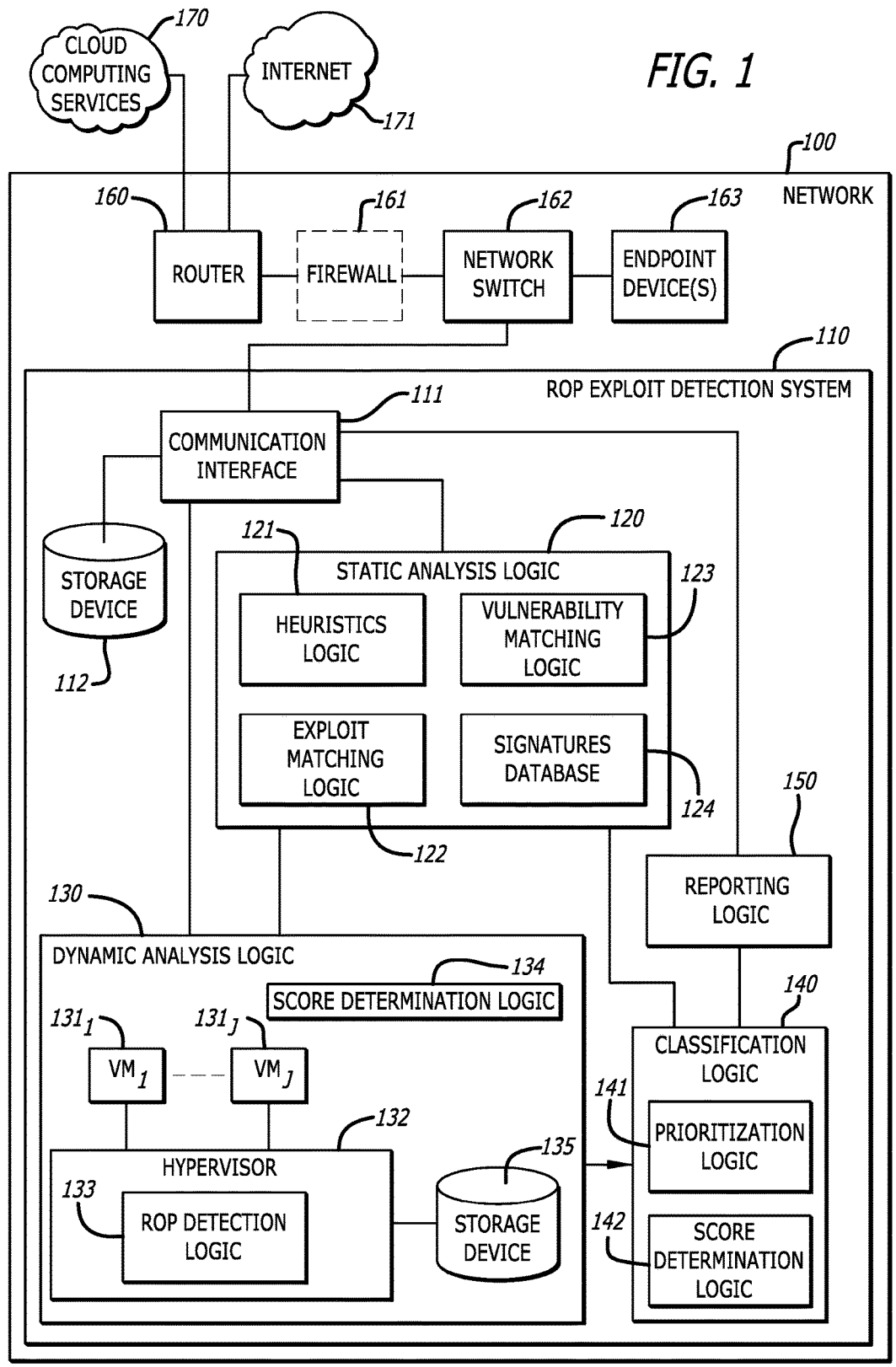
FIG. 1 is an exemplary block diagram of a return-oriented programming exploit detection system 110 deployed with the network 100.

Various embodiments of the disclosure relate to a return-oriented programming (ROP) exploit detection system that improves detection of ROP attacks by performing an analysis from within a hypervisor monitoring one or more virtual machines (VMs). As discussed above, a ROP exploit includes sequences of instructions (known as "gadgets") chained together through "return" instructions thereby accomplishing one or more tasks via the execution of the chain of gadgets.

In one embodiment of the disclosure, a portion of received network traffic is analyzed within one or more virtual machines of a ROP exploit detection system. The VM is managed by a hypervisor (also referred to as virtual machine monitor (VMM)) which resides between the VM and the hardware on which the VM is processed. Therefore, the hypervisor is able to intercept any function calls (e.g., application programming interface (API) function calls) made by an application executing in the VM and any transmissions sent from the hardware to the application. A detection component of the ROP exploit detection system, which resides in the hypervisor of the ROP exploit detection system, may instruct the managing and monitoring performed by the hypervisor. Specifically, the detection component may order the hypervisor to alter permissions on particular pages in memory associated with the application under analysis, and insert and/or remove breakpoints on functions of interest (e.g., a function included within a predefined set of functions that are known to be used with ROP attacks). Herein, a breakpoint may be one example of a transition event that may disrupt the flow of processing (e.g., cause the processing to be halted), and in some embodiments, pass control of the processing to a hypervisor. Examples of other transition events may include, but are not limited or restricted to, breakpoints, function calls, system calls, or alternative, specified instructions (the term "breakpoint" will be used herein, but the disclosure should not be limited). In one embodiment, the predefined set of functions may be a predefined set of API functions. In a second embodiment, the predefined set of functions may be one or more API functions and one or more instructions not associated with an API function. In yet another embodiment, a breakpoint may be placed on every instruction.

Responsive to the execution of the application under analysis hitting a breakpoint, the detection component may analyze the contents of the Last Branch Record (LBR) to determine whether previous branches adhere to the invariant discussed above. The detection component may inspect one or more MSR pairs of the LBR, specifically a FROM MSR, to determine whether this FROM MSR contains a memory address that points to a "return" instruction. When the location in the FROM MSR contains a "return" instruction, the detection component inspects the instruction immediately preceding the location branched to by the "return" instruction by inspecting the respective TO MSR. When the instruction immediately preceding the location branched to by the "return" instruction is not a "call" instruction, the detection component determines the execution of the application under analysis is exhibiting characteristics of ROP. When the instruction immediately preceding the location branched to by the "return" instruction is not a "call" instruction, the execution of the application has violated the invariant discussed above. Herein, a "call" instruction may be an instruction within 32-bit x86 assembly language programming, for example, that pushes a current code location onto a stack in memory and performs an unconditional jump instruction. A call instruction may also save the location to which to return when the call instruction is complete. Therefore, the detection component can conclude that the application under analysis is likely associated with a ROP attack.

Additionally, once a breakpoint is added to memory, the permissions of the page in memory at which the instruction on which the breakpoint was placed are set to "execute only." When the execution of the application attempts the read from, or write to, a page in memory having its permissions set to "execute only," the detection component instructs the hypervisor to remove the breakpoint(s) and set the permissions of the page to be "read and write only."

The above-described overview includes numerous advantages over the current technology. For example, by managing the breakpoint mechanism from within the hypervisor and in conjunction with the operation of the ROP detection logic, also within the hypervisor, the breakpoint mechanism is removed from the VM in which the process is executing; thus, the hypervisor may prevent the process from detecting that a breakpoint has been placed on an instruction (i.e., preventing the process from detecting its execution is being monitored). Additionally, as the hypervisor sets the permissions of the page on which a breakpoint is placed to "execute only," the hypervisor intercepts all attempts to read from and/or write to the page. This prevents the process from removing the breakpoint as well as detecting the breakpoint. In contrast, in current technology that includes exploit detection running within the VM executing the process, the executing process (or other processes executing) may detect the breakpoint and/or remove or alter the breakpoint.

Additionally, the hypervisor intercepts any attempts to read from or write to the MSRs which prevents the executing process (or other processes) from detecting the LBR functionality is enabled. Additionally, the hypervisor may prevent the disabling of the LBR functionality by an executing process. The hypervisor may intercept an attempt to read a control register of the MSRs (which would allow the process to determine whether the LBR functionality is enabled), and provide the process with a desired response (e.g., the hypervisor may provide the process with a response stating the LBR functionality is disabled, when the LBR functionality is actually enabled). Therefore, the executing process will not adjust its processing (which may include potentially suspicious, malicious and/or unwanted behaviors), allowing the ROP detection logic to determine whether the processing displays characteristics of ROP. In contrast, executing processes in current exploit detection technology implemented within the VM in which the process is executing may be able to read from and/or write to a control register of the MSRs, thereby detecting the LBR functionality is enabled and adjust its processing, and/or disable the LBR functionality.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software to cause a network device or other portions of a network to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "processing" may include execution of a binary or launching an application wherein launching should be interpreted as placing the application in an open state and, in some implementations, performing simulations of actions typical of human interactions with the application. For example, the application, an Internet browsing application, may be processed such that the application is opened and actions such as visiting a website, scrolling the website page, and activating a link from the website are performed (e.g., the performance of simulated human interactions).

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. In one embodiment, an object may include a binary file that may be executed within a virtual machine. Herein, the terms "binary file" and "binary" will be used interchangeably.

The term "network device" may be construed as any intelligent electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated to the application during processing, and/or (vii) other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting exploits associated with ROP attacks. As this invention is susceptible to embodiments of many different forms, it is intended that the present disclosure is to be considered as an example of the principles of the invention and not intended to limit the invention to the specific embodiments shown and described.

II. Network Appliance Deployment

1. Network Appliance Deployment

Referring to FIG. 1, an exemplary block diagram of a return-oriented programming exploit detection system 110 deployed within the network 100 is shown. In one embodiment, the network 100 may be an enterprise network that includes the return-oriented programming (ROP) detection system 110, a router 160, an optional firewall 161, a network switch 162, and one or endpoint devices 163. The network 100 may include a public network such as the Internet, a private network (e.g., a local area network "LAN", wireless LAN, etc.), or a combination thereof. The router 160 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the cloud computing services 170 and the endpoint devices 163. As is known in the art, the router 160 may provide access to the Internet for devices connected to the network 110.

In one embodiment, the network switch 162 may capture network traffic, make a copy of the network traffic, pass the network traffic to the appropriate endpoint device(s) 163 and pass the copy of the network traffic to the ROP exploit detection system 110. In a second embodiment, the network switch 162 may capture the network traffic and pass the network traffic to the ROP exploit detection system 110 for processing prior to passing the network traffic to the appropriate endpoint device(s) 163. In such an embodiment, the network traffic will only be passed to the appropriate endpoint device(s) 163 if the analysis of the network traffic does not indicate that the network traffic is associated with a malicious attack, anomalous or unwanted behavior, or, in particular, an exploit associated with a ROP attack.

The ROP exploit detection system 110 includes a communication interface 111, a storage device 112, a static analysis logic 120, a dynamic analysis logic 130, a classification logic 140, and a reporting logic 150.

As shown, the ROP exploit detection system 110 is communicatively coupled with the cloud computing services 170, the Internet and one or more endpoint devices 163 via the communication interface 111, which directs at least a portion of the network traffic to the static analysis logic 120 and/or the dynamic analysis 130. The static analysis logic 120 may include one or more software modules that, when executed by one or more processors, performs static scanning on a particular object, namely heuristics, exploit signature checks and/or vulnerability signature checks for example. The static analysis logic 120 and the dynamic analysis logic 130 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

More specifically, as shown, static analysis logic 120 may be configured with heuristics logic 121, exploit matching logic 122, and/or vulnerability matching logic 123. Heuristics logic 121 is adapted for analysis of certain portions of an object under analysis (e.g., the object may include a binary file) to determine whether any portion corresponds to either (i) a "suspicious" identifier such as either a particular Uniform Resource Locator "URL" that has previously been determined as being associated with known exploits, a particular source or destination (IP or MAC) address that has previously been determined as being associated with known exploits; or (ii) a particular exploit pattern. When deployed, the exploit matching logic 122 may be adapted to perform exploit signature checks, which may involve a comparison of an object under analysis against one or more pre-stored exploit signatures (e.g., pre-configured and predetermined attack patterns) from signatures database 124. Additionally or in the alternative, the static analysis logic 120 may be configured with vulnerability matching logic 123 that is adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

The classification logic 140 may be configured to receive the static-based results (e.g., results from static analysis, metadata associated with the incoming network traffic, etc.) and/or the VM-based results. According to one embodiment of the disclosure, the classification logic 140 comprises prioritization logic 141 and score determination logic 142. The prioritization logic 141 may be configured to apply weighting to results provided from dynamic analysis logic 130 and/or static analysis logic 120. Thereafter, the classification logic 140 may route the classification results comprising the weighting and/or prioritization applied to the static-based results and/or the VM-based results to the reporting logic 150. The classification results may, among others, classify any malware and/or exploits detected into a family of malware and/or exploits, describe the malware and/or exploits and provide the metadata associated with any object(s) within which the malware and/or exploits were detected. The reporting logic 150 may generate an alert for one or more endpoint devices 163 and/or route the alert to a network administrator for further analysis. In addition, the reporting logic 150 may store the classification results (including the static-based results 140 and the VM-based results 150) in the storage device 112 for future reference.

The static analysis logic 120 may route suspicious objects (and, in many cases, even previously classified malicious objects) to the dynamic analysis logic 130. In one embodiment, the dynamic analysis logic 130 is configured to provide, at least, an analysis of a binary included in the received network traffic and/or suspicious object(s) from the static analysis logic 120 by analyzing the content of one or more LBRs associated with the VM processing the binary.

Upon receiving at least a binary file from the communication interface 111 and/or the static analysis logic 120, the dynamic analysis logic 130 performs processing within one or more VMs on the binary, e.g., the binary is executed within the one or more VMs $131_1$-$131_j$ (where j≥1). The processing may occur within one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. During the processing within the virtual machine, the network traffic is analyzed.

As will be discussed in detail below, the binary will begin execution within a virtual machine wherein the permissions of the pages of memory associated with the binary are set to "read only." When the binary attempts to execute an instruction on a page having its permissions set to "read only," the execution is halted, the page is analyzed to determine whether a function of interest (e.g., a function included in a set of predefined functions that are known to likely be associated with ROP attacks), and when the page includes one or more functions of interest, the hypervisor writes a breakpoint at the location in memory of the first instruction of the function. The permissions of the page are set to "execute only," and the execution of the binary resumes. In a first scenario, when a breakpoint is hit, the execution is again halted and the detection component within the hypervisor performs an analysis of the LBRs to determine whether the execution of the binary is exhibiting ROP characteristics. In a second scenario, when the execution of the binary file results in an attempt to read or write to a page having its permissions set to "execute only," (e.g., a page containing a breakpoint), the execution is halted, the breakpoint is removed and the permissions of the page are set to "read and write only." In the second scenario, the removal of the breakpoint is done to prevent the binary from detecting that its execution is being monitored. In some instances, once a binary detects that its execution is being monitored, it may alter its execution so that it no longer attempts to perform anomalous or malicious behaviors or operations in order to avoid detection.

2. Logical Representation

Figure 2:
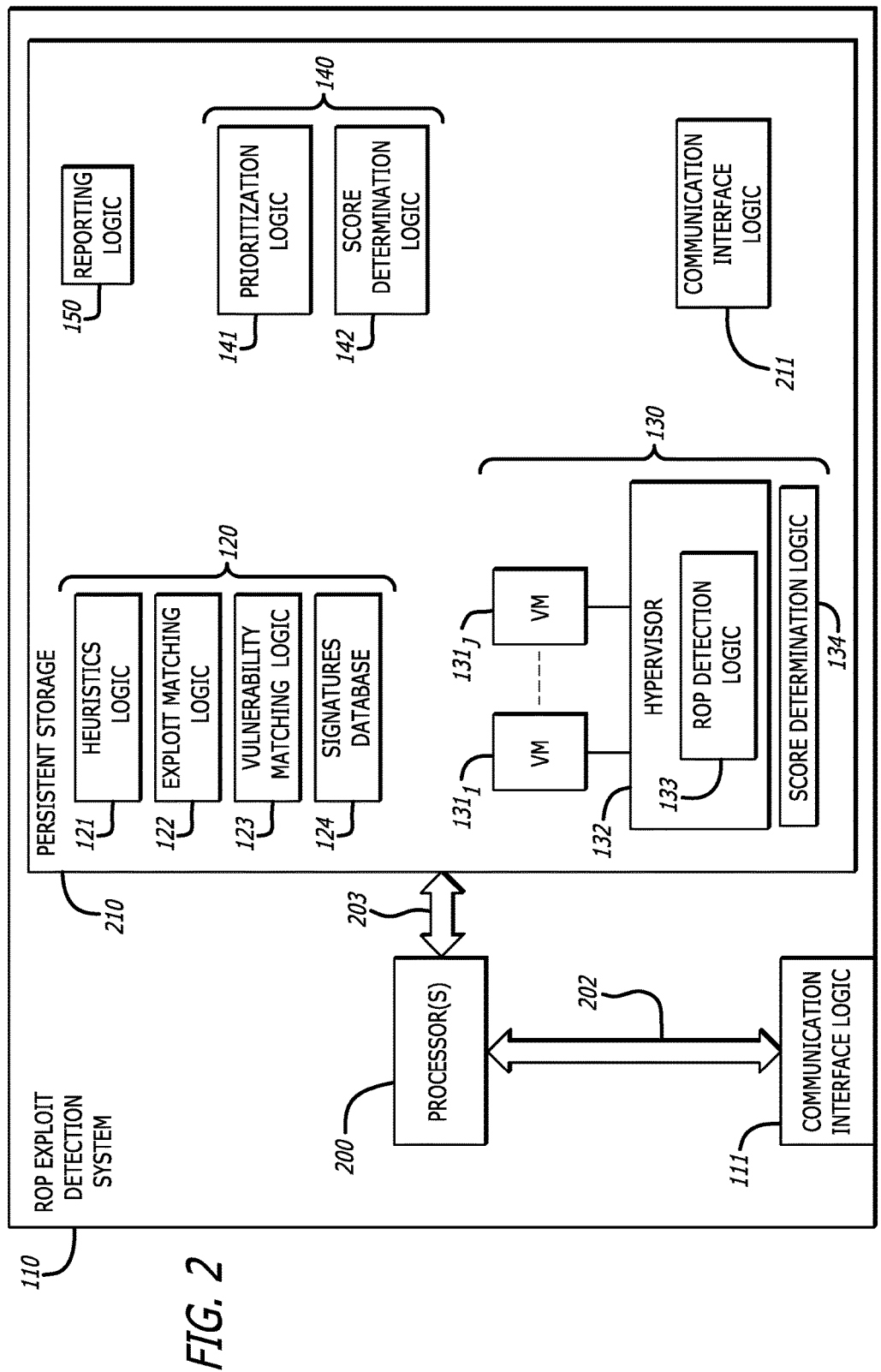
FIG. 2 is an exemplary embodiment of a logical representation of the return-oriented programming exploit detection system of FIG. 1.

FIG. 2 is an exemplary embodiment of a logical representation of the return-oriented programming exploit detection system of FIG. 1. The ROP detection system 110 includes one or more processors 200 that are coupled to communication interface 111 via a first transmission medium 202. The communication interface 111, and the communication interface logic 211 located within a persistent storage 210, enables communication with network devices via the Internet, the cloud computing services and one or more the endpoint devices. According to one embodiment of the disclosure, the communication interface 111 may be implemented as a physical interface including one or more ports for wired connectors. Additionally, or in the alternative, the communication interface logic 111 may be implemented with one or more radio units for supporting wireless communications with other electronic devices.

The processor(s) 200 is further coupled to persistent storage 210 via a second transmission medium 203. According to one embodiment of the disclosure, persistent storage 210 may include (a) the static analysis logic 120 including a heuristics logic 121, an exploit matching logic 122, a vulnerability matching logic 123, and a signatures database 124, (b) a dynamic analysis logic 130 including one or more VMs $131_1$-$131_j$, a hypervisor, also referred to as a virtual machine monitor (VMM), 132, which includes a ROP detection logic 133 (e.g., a detection component), and a score determination logic 134, (c) a classification logic 140 including a prioritization logic 141, and a score determination logic 142, and (d) a reporting logic 150. Of course, when implemented as hardware, one or more of these logic units could be implemented separately from each other.

III. Return-Oriented Programming Detection Methodology

Figure 3:
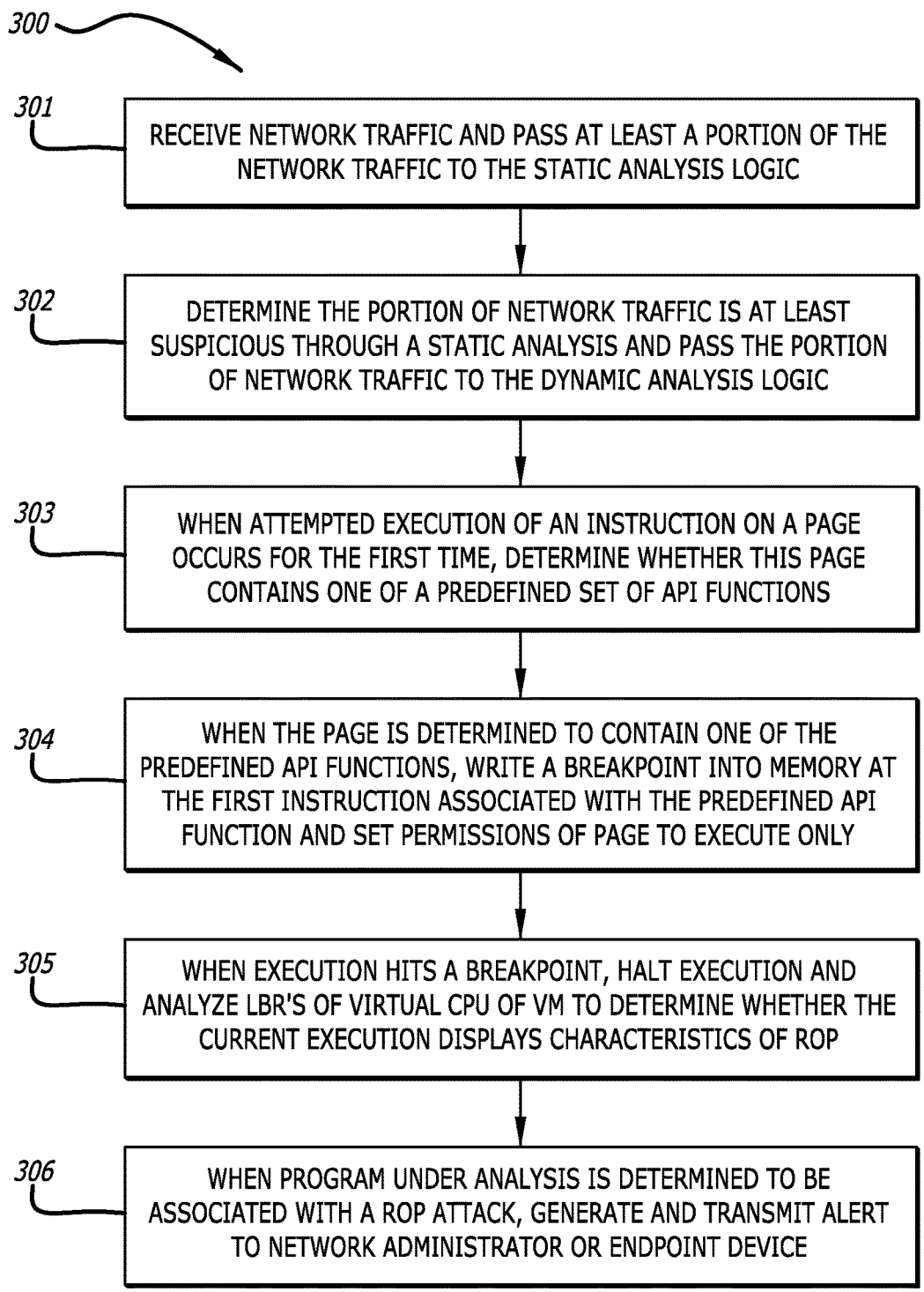
FIG. 3 is a flowchart illustrating an exemplary method for detecting exploits associated with a return-oriented programming attack using Last Branch Records from within a hypervisor of the return-oriented programming exploit detection system of FIG. 1.

FIG. 3 is a flowchart illustrating an exemplary method for detecting exploits associated with a return-oriented programming attack by analyzing Last Branch Records (LBRs) from within a hypervisor of the ROP exploit detection system of FIG. 1. Each block illustrated in FIG. 3 represents an operation performed in the method 300 of detecting exploits associated with a ROP attack using LBRs from within a hypervisor of a ROP exploit detection system. Referring to FIG. 3, the ROP exploit detection system receives network traffic and passes at least a portion of the network traffic to the static analysis logic (block 301).

At block 302, the static analysis logic determines the portion of the network traffic is at least suspicious through performance of a static analysis and passes at least the suspicious portion of the network traffic to the dynamic analysis logic. Upon receiving the portion of the network traffic, one or more VMs within the dynamic analysis logic are provisioned with a guest image and execution of the portion of the network traffic, e.g., a binary file, begins in each of the one or more provisioned VMs. At block 303, when the binary file attempts to execute an instruction on a page in memory associated with the binary file within the VM for the first time, the execution is halted and the detection component of the ROP exploit detection system requests that the hypervisor determine whether the page contains one of a predefined set of application programming interface (API) function.

When the page is determined to contain one or more of the predefined set of functions, the detection component requests that the hypervisor write a breakpoint into memory at the first instruction associated with the predefined function (block 304). Additionally, the detection component requests that the hypervisor sets the permissions of the page to "execute only." At block 305, when the execution of the binary file hits a breakpoint, the hypervisor halts the execution and the detection component within the hypervisor analyzes the LBRs of the CPU of the VM to determine whether the currently execution displays characteristics of ROP.

Finally, when the binary file under analysis is determined to be associated with a ROP attack (e.g., the execution exhibits characteristics of ROP), the ROP exploit detection generates an alert and transmits the alert to a network administrator and/or one or more endpoint devices (block 306).

1. Implementation of Breakpoint Mechanism

Figure 4:
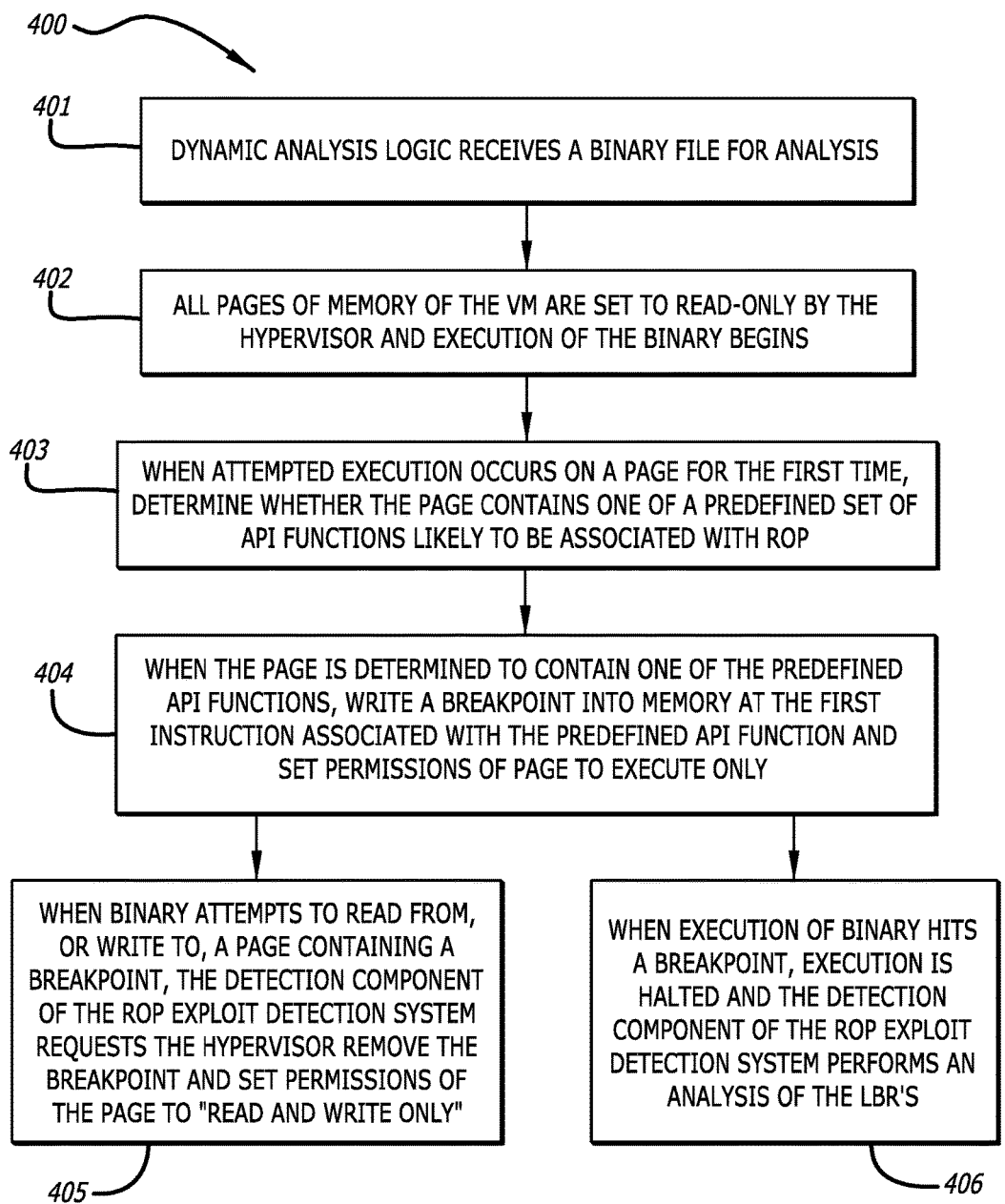
FIG. 4 is a flowchart illustrating an exemplary method for implementing a breakpoint mechanism of the return-oriented programming exploit detection method from within a hypervisor of the return-oriented programming exploit detection system of FIG. 1.

FIG. 4 is a flowchart illustrating an exemplary method for implementing a breakpoint mechanism of the ROP exploit detection method from within a hypervisor of the ROP exploit detection system of FIG. 1. Each block illustrated in FIG. 4 represents an operation performed in the method 400 of implementing the breakpoint mechanism as used within the ROP exploit detection process from within the hypervisor of a ROP exploit detection system. Referring to FIG. 4, the dynamic analysis logic of the ROP exploit detection system receives at least a binary file from within network traffic received by the ROP exploit detection system (block 401). In one embodiment, the portion of the received network traffic that includes the binary file may have been analyzed by the static analysis logic of the ROP exploit detection system and determined to be suspicious or malicious. In a second embodiment, the portion of the received network traffic that includes the binary file may have been passed directly to the dynamic analysis logic from the communication interface (e.g., the processing by the dynamic analysis logic may be performed without the ROP exploit detection system performing a static analysis or the processing by with dynamic analysis logic and the static analysis may be performed concurrently, meaning at least partly overlapping in time).

At block 402, the pages of the memory associated with the VM are set to "read-only" by the hypervisor and execution of the binary file begins. At block 403, when the execution of the binary file attempts to execute an instruction on a page for the first time, the detection component of the ROP exploit detection system requests that the hypervisor determine whether the page contains one of a predefined set of functions likely to be associated with ROP. For example, the predefined set of functions may be compiled as a result of experiential knowledge.

At block 404, when the page is determined to at least contain one of the predefined functions, the detection component requests that the hypervisor (i) write a breakpoint into memory at the first instruction associated with the predefined instruction. Additionally, the hypervisor sets the permissions of the page to "execute only." The execution of the binary file is then resumed within the VM.

When the binary attempts to subsequently read from, or write to, a page containing a breakpoint (e.g., a page that has its permissions set to "execute only" due to the presence of the breakpoint), the detection component requests the hypervisor remove the breakpoint and set the permissions of the page to "read and write only." As was discussed above, by monitoring the execution of the binary file under analysis from the hypervisor, the ROP exploit detection system can prevent the binary file from detecting the execution is being monitored by preventing the binary file from reading that a breakpoint has been written into memory. Thereafter, execution of the binary file continues with the binary file being permitted to read and write to the designated page. However, when the binary file attempts to execute an instruction on a page having its permissions set to "read and write only," the process starts again (e.g., the method 400 returns to block 403).

When the execution of the binary file hits a breakpoint, the execution of the binary file is halted at the instruction on which the breakpoint was placed and the detection component performs an analysis of the contents of one or more LBRs associated with the VM processing the binary file (block 406). The analysis of the contents of the one or more LBRs will be discussed below with respect to FIG. 6.

Figure 5:
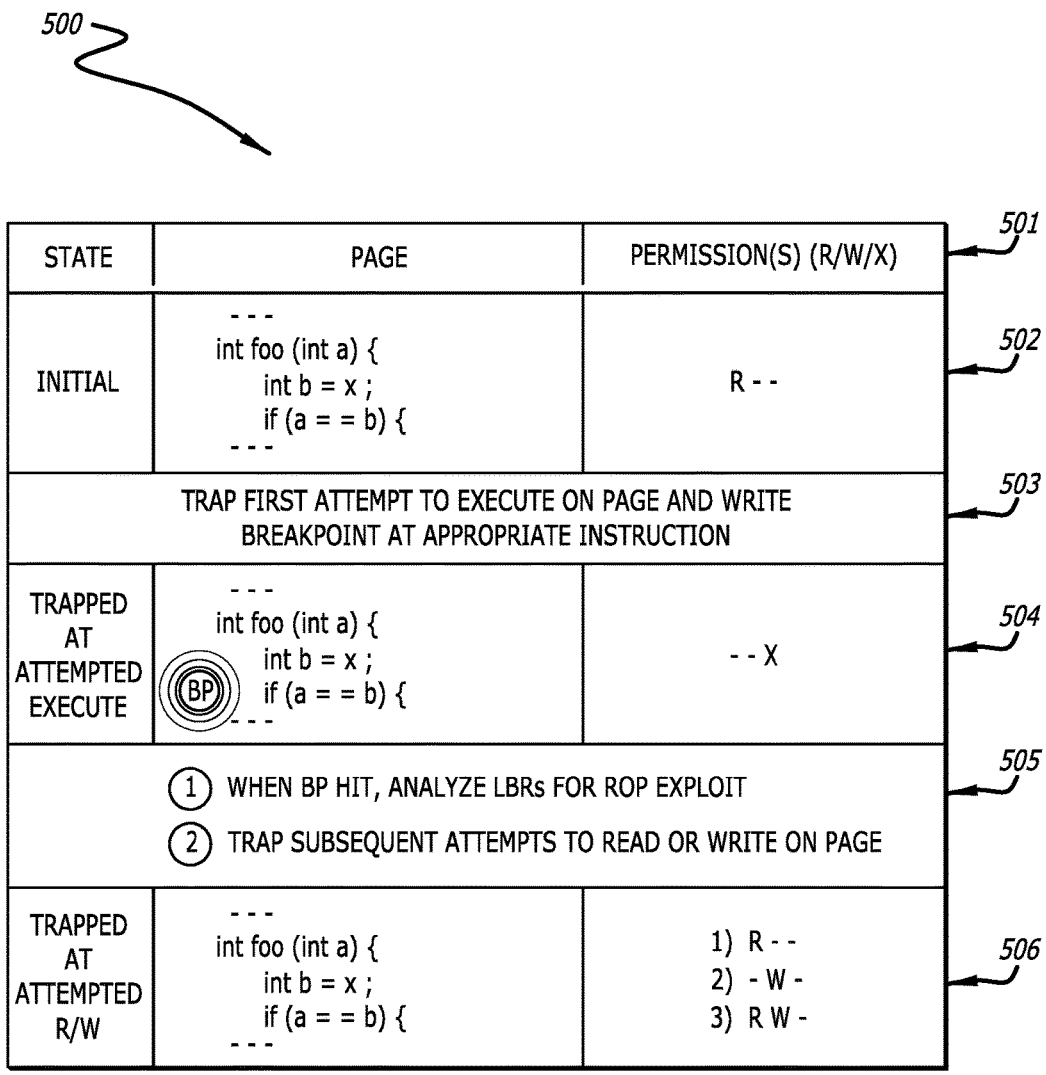
FIG. 5 is a block diagram illustrating an exemplary method for implementing a breakpoint mechanism of the return-oriented programming exploit detection method from within a hypervisor of the return-oriented programming exploit detection system of FIG. 1.

Referring to FIG. 5, a block diagram illustrating an exemplary process of implementing a breakpoint mechanism of the return-oriented programming exploit detection method from within a hypervisor of the ROP exploit detection system of FIG. 1 is shown. Diagram 500 includes six rows, rows 501-506. Row 501 serves as a header to the diagram and sets forth (i) the left-most column of rows 502, 504 and 506 represents the state of the execution; (ii) the center column of rows 502, 504 and 506 represents the relevant portion of the page under analysis in memory; and (iii) the right-most column 502, 504 and 506 represents the permission(s) of the page under analysis in memory.

Referring to row 502, the execution is in its initial stage, which implies that an attempted execution of the page has not been trapped and no breakpoints have been inserted or removed from the page. The center column of row 502 illustrates an exemplary portion of code of an application that is stored in memory on the page under analysis (FIG. 5 merely shows a sample portion of code and does not limit the disclosure to the code explicitly illustrated). The portion of code illustrated does not include a breakpoint. The right-most column indicates that the permissions of the page under analysis are set to "read only."

Referring to row 503, the ROP exploit detection system will trap the first attempt to execute on the page and write a breakpoint at the appropriate instruction, if applicable. In one embodiment, when an application under analysis is executing in a VM and the application attempts to execute an instruction on the page wherein its permissions are set to "read only," the hypervisor monitoring the execution of the application will halt the execution of the application, without indicating such a halt to the application, and determine whether the page includes an instruction (or function) of interest. As disclosed above, the instruction or function of interest may be one of a predefined set of instructions or functions that are known to likely be associated with ROP attacks. When the hypervisor determines such an instruction or function is present on the page, the hypervisor inserts a breakpoint into the memory at the location of the appropriate instruction (e.g., the instruction of interest or the first instruction of the function) and sets the permissions of the page to be "execute only." Thereafter, the application may continue to execute, and because it cannot read from the page, the application cannot detect that a breakpoint has been set.

Referring to row 504, the page under analysis is currently trapped (e.g., halted) at the attempted execution of an instruction on the page. The center column illustrates that a breakpoint has been inserted at the instruction, "if (a==b)," and the right-most column indicates that the permissions have been set to "execute only."

Referring to row 505, in the first scenario, when a breakpoint is hit, the execution is again halted and the detection component within the hypervisor performs an analysis of one or more LBRs to determine whether the execution of the application is exhibiting ROP characteristics. In the second scenario, when the execution of the application results in an attempt to read or write to the page (e.g., the page now containing a breakpoint), the execution is halted, the breakpoint is removed and the permissions of the page are set to one of (i) "read only"; (ii) "write only"; or (iii) "read and write only."

Referring to row 506, the page under analysis is currently trapped (e.g., halted) at the attempted read from or write to the page. The center column illustrates that the breakpoint previously inserted at the instruction, "if (a==b)," has been removed and the right-most column indicates that the permissions have been set to one of (i) "read only"; (ii) "write only"; or (iii) "read and write only."

In the above embodiment, the adjustment of permissions occurs with the second stage page tables. The ROP exploit detection system utilizes a first set of page tables that translate guest virtual addresses (GVAs) to guest physical addresses (GPAs) and a second set of page tables that translate GPAs to host physical addresses (HPAs). The second set of page tables may be referred to as extended page tables (EPTs) or nested page tables (NPT). Alternatively, the second set of page tables may be referred to as second stage or 2D page tables as well. The ROP exploit detection system manipulates the permissions of the pages discussed herein at the EPT level.

2. Last Branch Record Analysis

Figure 6:
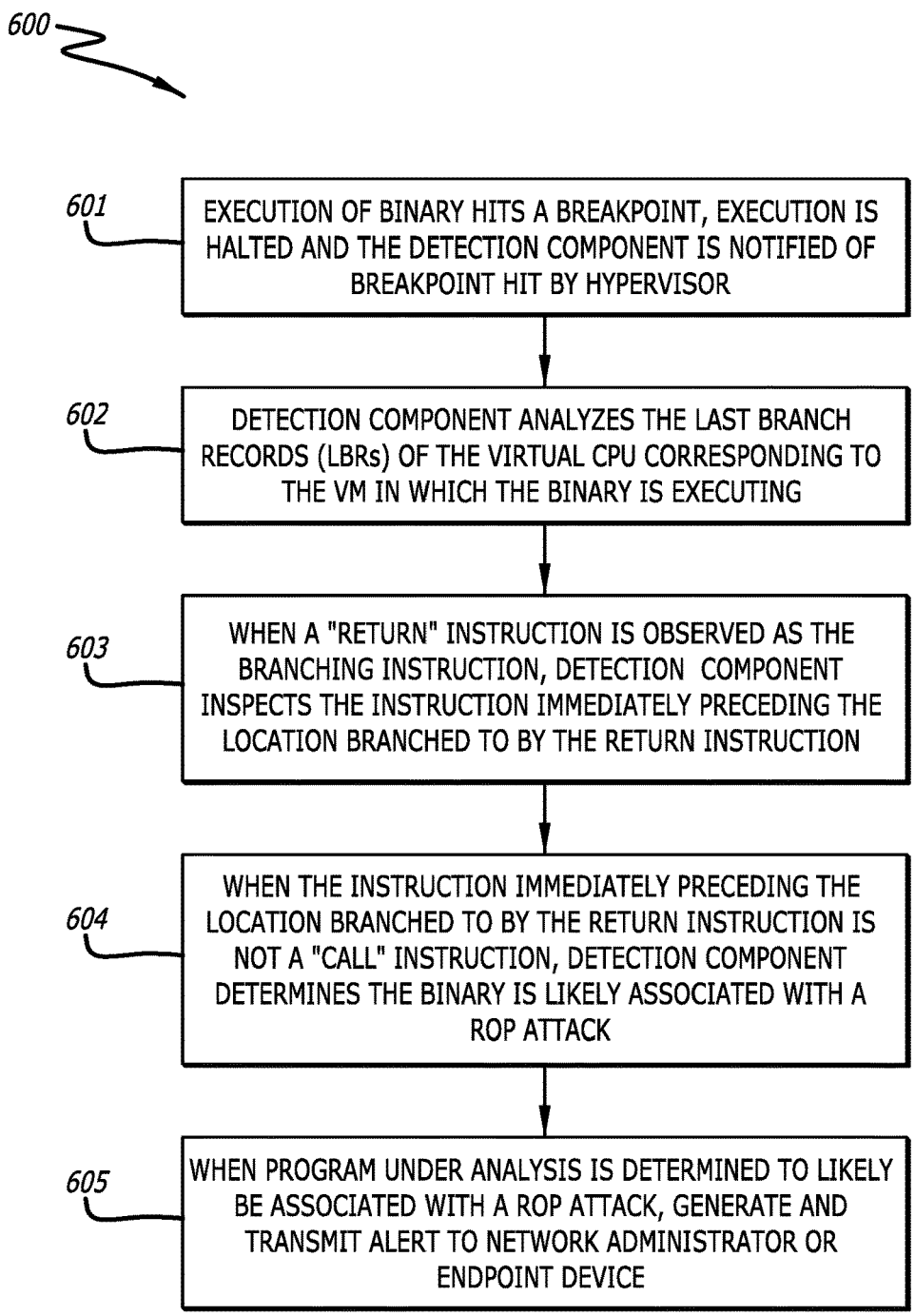
FIG. 6 is a flowchart illustrating an exemplary method for analyzing the Last Branch Records of a CPU of a virtual machine from within a hypervisor of the return-oriented programming exploit detection system of FIG. 1.

Referring to FIG. 6, a flowchart illustrating an exemplary method for analyzing the Last Branch Records of a CPU of a virtual machine from within a hypervisor of the ROP exploit detection system of FIG. 1 is shown. Each block illustrated in FIG. 6 represents an operation performed in the method 600 of analyzing the contents of one or more LBRs of a CPU associated with a VM within which a binary file is being executed. Referring to FIG. 6, prior to block 601, the binary file has been executing within the VM, a breakpoint has been inserted into memory and the permissions of the page in memory in which the breakpoint is located have been set to "execute only." At block 601, the execution of the binary file hits a breakpoint, execution is halted and the detection component is notified of the breakpoint hit by the hypervisor.

Responsive to being notified of the breakpoint hit, the detection component begins an analysis of the LBRs of the CPU corresponding to the VM in which the binary file is executing (block 602). Specifically, the detection component analyzes the branching instructions recorded in the LBRs of the CPU to determine whether a "return" instruction was previously made by the executing binary file.

When a "return" instruction is observed as a branching instruction, the detection component inspects the instruction in memory immediately preceding the location branched to by the "return" instruction (block 603). As discussed above, one invariant of computer software is that a software program not associated with ROP will pair a "call" instruction with a "return" instruction such that a "return" instruction should branch to an instruction immediately preceded by a "call" instruction.

Thus, when the instruction immediately preceding the location branched to by the "return" instruction is not a "call" instruction, the detection component determines the execution of the binary file is exhibiting characteristics of ROP (block 604). In one embodiment, the observation of that the instruction immediately preceding the location branched to by the "return" instruction in not a "call" instruction is provided to a score determination logic within the dynamic analysis logic so that a score indicating a likelihood the binary file is associated with a ROP attack may be determined. In a second embodiment, the dynamic analysis logic may provide a classification logic outside of the dynamic analysis logic the results of the dynamic analysis logic such that the classification logic may perform a prioritization (e.g., a weighting) of the results of the static analysis and the dynamic analysis to determine a score indicating the likelihood that the analyzed portion of received network traffic is associated with a ROP attack. As discussed above, a score above a predefined threshold may indicate that the binary file, or portion of the received network traffic, is malicious and associated with a ROP attack.

When the binary file under analysis (or more generally, the portion of the received network traffic) is determined to likely be associated with a ROP attack, the ROP exploit detection system generates an alert and transmits the alert to a network administrator and/or one or more endpoint devices (block 605). More specifically, the reporting logic of the ROP exploit detection system generates the alert and transmits the alert via the communication interface of the ROP exploit detection system.

In the foregoing description, the invention is described with reference to specific exemplary embodiments thereof.

It will, however, be evident that various modifications and changes may be made thereto without departing from the broader spirit and scope of the invention as set forth in the appended claims.

What is claimed is:

1. A non-transitory storage medium having stored thereon logic, the logic being executable by one or more processors to perform operations including:
   intercepting an attempted execution of an instruction resulting from processing of the object within a virtual machine, the instruction located on a page in memory that is accessed by the virtual machine;
   responsive to determining the page includes instructions corresponding to a function call of a predefined set of function calls, (i) inserting a first transition event into the memory at a starting address location of the function call of the predefined set of function calls, and (ii) setting a permission of the page to be execute only; and
   responsive to a triggering of the first transition event, (1) halting, by a virtual machine monitor, the processing of the object, and (2) analyzing, by logic within the virtual machine monitor, content of one or more last branch records associated with the virtual machine to determine whether the processing of the object displays characteristics of a return-oriented programming attack, wherein the analyzing includes:
      (i) parsing the one or more last branch records associated with the virtual machine, and
      (ii) responsive to detecting a return instruction as a branching instruction and determining an instruction immediately preceding a location branched to by the return instruction is not a call instruction type, determining the processing of the object displays characteristics of the return-oriented programming attack.

2. The non-transitory storage medium of claim 1, wherein the instructions being executable by the one or more processors to perform operations further including:
   receiving the object within network traffic;
   performing a static analysis on the object; and
   responsive to determining the object is at least suspicious, providing the object to the virtual machine for processing.

3. The non-transitory storage medium of claim 1, wherein a permission of each page in memory associated with the virtual machine is set to prohibit execution when the processing of the object begins.

4. The non-transitory storage medium of claim 1, wherein the instructions being executable by the one or more processors to perform operations further including:
   responsive to determining the processing displays characteristics of the return-oriented programming attack, generating an alert indicating the processing displays characteristics of the return-oriented programming attack.

5. The non-transitory storage medium of claim 1, wherein the first transition event includes a breakpoint.

6. An electronic device comprising:
   one or more processors;
   a storage device for storing one or more instructions, the one or more instructions being executable by the one or more processors to perform operations including:
      processing of an object within a virtual machine managed by a virtual machine monitor,
      intercepting an initial attempted execution of an instruction resulting from the processing the object, the instruction located on a page in memory associated with the virtual machine;
      responsive to determining the page includes instructions corresponding to a function call of a predefined set of function calls, (i) inserting a first transition event into the memory associated with the virtual machine at a location on the page of a first instruction of the instructions corresponding to the function call of the predefined set of function calls, and (ii) setting a permission of the page to be execute only, and
      responsive to a triggering of the first transition event, (1) halting, by the virtual machine monitor, the processing of the object, and (2) analyzing, by logic within the virtual machine monitor, content of one or more last branch records associated with the virtual machine to determine whether the processing of the object displays characteristics of a return-oriented programming attack, wherein the analyzing includes:
         (i) parsing the content of the one or more last branch records associated with the virtual machine, and
         (ii) responsive to detecting a return instruction as a branching instruction and determining an instruction immediately preceding a location branched to by the return instruction is not a call instruction type, determining the processing of the object displays characteristics of the return-oriented programming attack.

7. The electronic device of claim 6, wherein the logic being executable by the one or more processors to perform operations further including:
   receiving the object within network traffic;
   performing a static analysis on the object; and
   responsive to determining the object is at least suspicious, providing the object to the virtual machine for processing.

8. The electronic device of claim 6, wherein a permission of each page in memory associated with the virtual machine is set to prohibit execution when the processing of the object begins.

9. The electronic device of claim 6, wherein the logic being executable by the one or more processors to perform operations further including:
   responsive to determining the processing of the object displays characteristics of the return-oriented programming attack, generating an alert indicating the processing displays characteristics of the return-oriented programming attack.

10. The electronic device of claim 6, wherein the first transition event includes a breakpoint.

11. A method for detecting a return-oriented programming attack comprising:
    processing of an object within a virtual machine managed by a virtual machine monitor;
    intercepting an initial attempted execution of an instruction resulting from the processing of the object, the instruction located on a page in memory associated with the virtual machine;
    responsive to determining the page includes instructions corresponding to a function call of a predefined set of function calls, (i) inserting a first transition event into the memory associated with the virtual machine at a location on the page of a first instruction of the instructions corresponding to the function call of the predefined set of function calls, and (ii) setting a permission of the page to be execute only; and
    responsive to a triggering of the first transition event, (1) halting, by the virtual machine monitor, the processing of the object, and (2) analyzing, by logic within the virtual machine monitor, content of one or more last branch records associated with the virtual machine to determine whether the processing of the object displays characteristics of a return-oriented programming attack, wherein the analyzing includes:
- (i) parsing the one or more last branch records associated with the virtual machine, and
- (ii) responsive to detecting a return instruction as a branching instruction and determining an instruction immediately preceding a location branched to by the return instruction is not a call instruction type, determining the processing of the object displays characteristics of the return-oriented programming attack.

12. The method of claim 11 further comprising:
receiving the object within network traffic;
performing a static analysis on the object; and
responsive to determining the object is at least suspicious, providing the object to the virtual machine for processing.

13. The method of claim 12, wherein a permission of each page in memory associated with the virtual machine is set to prohibit execution when the processing of the object begins.

14. The method of claim 11, wherein the first transition event includes a breakpoint.

15. A method for detecting a return-oriented programming attack comprising:
processing of an object within a virtual machine managed by a virtual machine monitor;
managing, by the virtual machine monitor, insertion of a transition event on an instruction located on a page in memory utilized by the virtual machine;
managing, by the virtual machine monitor, permissions of the page in memory according to the insertion of the transition event or a removal of the transition event in the instruction; and
responsive to a triggering of the transition event, analyzing, by logic within the virtual machine monitor, content of one or more last branch records associated with the virtual machine to determine whether the processing of the object displays characteristics of a return-oriented programming attack, wherein the analyzing includes:
- (i) parsing the content of the one or more last branch records associated with the virtual machine, and
- (ii) responsive to detecting a return instruction as a branching instruction and determining an instruction immediately preceding a location branched to by the return instruction is not a call instruction type, determining the processing of the object displays characteristics of the return-oriented programming attack.

16. The method of claim 15 further comprising:
receiving the object within network traffic;
performing a static analysis on the object; and
responsive to determining the object is at least suspicious based on the static analysis, providing the object to the virtual machine for processing.

17. The method of claim 15, wherein a permission of the page in memory is set to prohibit execution when the processing of the object begins.

18. The method of claim 15, wherein the transition event includes a breakpoint.

19. The method of claim 15, wherein the transition event includes an event that disrupts a flow of processing.

20. The storage medium of claim 1, wherein prior to intercepting an attempted execution, the method further comprising:
processing of the object within the virtual machine monitored by the virtual machine monitor.

21. A method for detecting a return-oriented programming attack, comprising:
processing of an object within a virtual machine, the virtual machine being managed by a virtual machine monitor;
managing, by the virtual machine monitor, insertion of a transition event on a function of interest located on a page in memory utilized by the virtual machine;
managing, by the virtual machine monitor, permissions of the page in memory according to the insertion of the transition event or a removal of the transition event in the instruction; and
responsive to a triggering of the transition event, analyzing, by logic within the virtual machine monitor, recorded data associated with the virtual machine to determine whether the processing of the object displays characteristics of a return-oriented programming attack, wherein the analyzing includes: (i) parsing the content of the one or more last branch records associated with the virtual machine, and (ii) responsive to detecting a return instruction as a branching instruction and determining an instruction immediately preceding a location branched to by the return instruction is not a call instruction type, determining the processing of the object displays characteristics of the return-oriented programming attack.

22. The method of claim 21 further comprising:
receiving an object within network traffic;
performing a static analysis on the object; and
responsive to determining the object is at least suspicious based on the static analysis, providing the object to the virtual machine for processing.

23. The method of claim 22, wherein a permission of the page in memory is set to prohibit execution when the processing of the object begins.

24. The method of claim 22, wherein the transition event includes a breakpoint.

25. The method of claim 21, wherein the transition event includes an event that disrupts a flow of processing.

26. The method of claim 21, wherein the recorded data associated with the virtual machine includes recorded data associated with the virtual machine, the recorded data being used to determine whether the processing of the object displays characteristics of the return-oriented programming attack.

* * * * *